United States Patent

[11] 3,586,109

| [72] | Inventors | William C. Eversole<br>Latrobe;<br>John F. Kita, Greensburg, both of, Pa. |
|---|---|---|
| [21] | Appl. No. | 808,177 |
| [22] | Filed | Mar. 18, 1969 |
| [45] | Patented | June 22, 1971 |
| [73] | Assignee | Kennametal Inc.<br>Latrobe, Pa. |

[54] TINE
7 Claims, 3 Drawing Figs.

| [52] | U.S. Cl. | 172/22,<br>172/747 |
|---|---|---|
| [51] | Int. Cl. | A01b 45/02 |
| [50] | Field of Search | 172/21, 22,<br>719, 747 |

[56] References Cited

UNITED STATES PATENTS

| 1,965,950 | 7/1934 | Walker | 172/747 X |
| 2,612,725 | 10/1952 | Casey | 72/22 X |
| 3,022,833 | 2/1962 | Reaser | 172/22 X |
| 3,113,534 | 12/1963 | Wessel | 172/22 X |
| 3,168,767 | 2/1965 | Lutz | 172/719 X |
| 3,273,930 | 9/1966 | Gottfried | 172/22 X |
| 3,429,378 | 2/1969 | Moscaro | 172/22 |

FOREIGN PATENTS

| 522,286 | 6/1940 | Great Britain | 172/22 |

*Primary Examiner*—Robert E. Pulfrey
*Assistant Examiner*—Alan E. Kopecki
*Attorney*—Melvin A. Crosby

ABSTRACT: The invention concerns a tubelike tine for being driven endwise into the turf, especially the turf of golf greens, and is characterized by the provision of an extremely hard wear-resistant element fixed to the working end of the tine.

PATENTED JUN22 1971 3,586,109

INVENTORS
WILLIAM C. EVERSOLE
BY JOHN F. KITA

TINE

SUMMARY OF THE INVENTION

The present invention is concerned with the provision of a hard tip on the end of a hollow steel tine. The tip is preferably in the form of a relatively short cylinder of hard wear-resistant material, such as a cemented carbide of tungsten or titanium or the like or mixtures thereof. The short cylinder, or sleeve, or tubular element, of wear-resistant material is tapered on its opposite ends with one end presenting the cutting edge for penetrating the turf and the earth therebeneath and with the other end being adapted to seat in a taper formed on the tip end of the time for brazing to the tine.

This invention relates to equipment for working grassy areas, particularly golf greens, and is especially concerned with equipment for aerating grassy areas.

The aerating of grassy areas, particularly golf greens, is known and is accomplished by piercing the turf with relatively small diameter hollow tines which take small cores from the turf and the earth therebeneath so as to make holes through the turf for easy access of air to the ground therebeneath. Golf greens are made up with a soil containing a fairly large percentage of sand so the earth will drain readily and will remain relatively porous so that the special grasses used on golf greens will grow properly thereon. While the aerating of the turf by repeatedly pressing hollow tines therethrough is relatively simple to accomplish, the tines wear away rapidly due to the abrasive effect of the sand and the periodic replacement of the tines represents an inconvenience and a substantial expense.

It has been found that such tines, even when made of a highgrade steel, must be replaced quite frequently so that, in going once over a nine-hole course, a number of tines would normally be used up, and requiring considerable time for replacing the tines.

Having the foregoing in mind, a primary objective of the present invention is the provision of an improved construction for tines of the nature referred to which will substantially increase the life thereof.

Another object of this invention is the provision of a tine of the nature referred to having a wear-resistant tip thereon which will greatly increase the life of the tine.

A still further object of the present invention is the provision of a tine of the nature referred to having hard tipping applied thereto in such a manner that the tipping will not readily break in use.

The foregoing objects of the present invention as well as still other objects and advantages thereof will become more apparent upon reference to the following detailed specification, taken in connection with the accompanying drawings in which.

DETAILED DESCRIPTION

Figure 1:
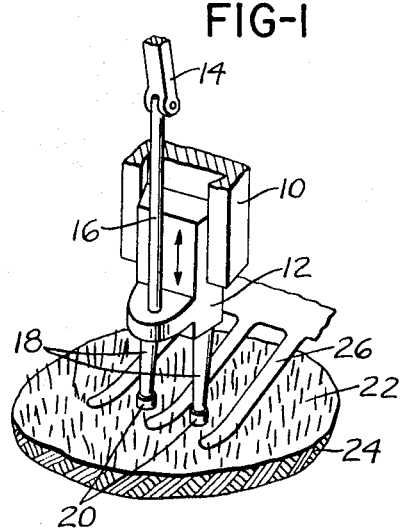
FIG. 1 is a schematic view showing an arrangement for supporting the tines according to this invention during operation.

In FIG. 1, reference numeral 10 designates the frame of a machine having a plurality blocks 12 vertically reciprocable therein as by a crankshaft. Each block 12 (only one being shown) is reciprocated by a connecting rod 14 connected to the block by a rod 16. Detachably mounted in the block and projecting vertically downwardly therefrom are tines 18 which taper inwardly slightly toward the bottom and which are hollow from end to end. Each block may carry two tines, as shown. The tines have the hard tips 20, according to the present invention, thereon, which are adapted to penetrate the turf 22 and the earth 24 immediately therebeneath so as to cut small cores from the earth and thereby permit air readily to enter the ground beneath the turf.

A comblike element 26 carried by the machine frame is adapted for resting on the ground adjacent the tines and prevents the turf from being lifted when the blocks 12, and the tines thereon, move vertically upwardly.

Figure 2:
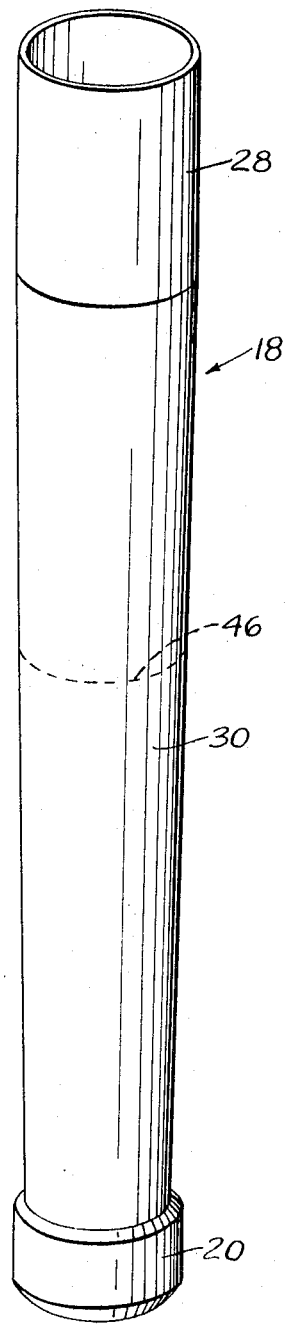
FIG. 2 is a perspective view showing a tine constructed according to the present invention.
Figure 3:
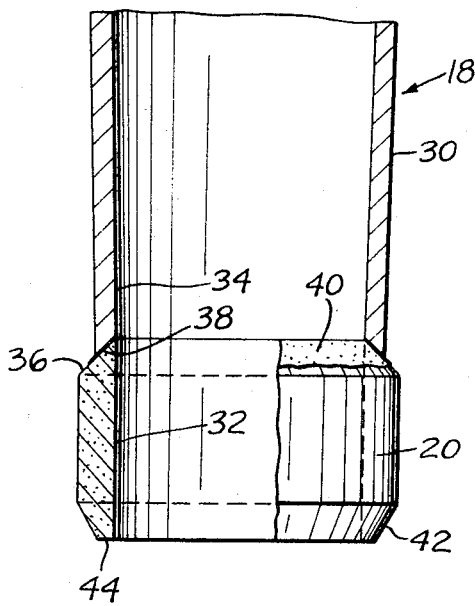
FIG. 3 is an enlarged vertical sectional view of the tine showing the hard tipping applied thereto and the manner in which it is connected to and supported on the tine.

Turning now to FIGS. 2 and 3, each tine 18 will be seen to have a cylindrical upper end region 28 and a lower region 30 tapering inwardly to the lower end of the tine where it is joined to the hard tip 20. Tines of certain manufacture may have different upper end configurations for connecting the tines to the support block therefor and it will therefore be understood that the particular tine construction illustrated is merely exemplary except with respect to the hard tipping thereof.

FIG. 3 will show that hard tip 20 which, as mentioned, may be made from cemented tungsten carbide, is in the form of a relatively short tubular member having a central bore 32 about the same size as the passage 34 in the pertaining tine at the bottom of the latter. The upper end of hard tip 20 is tapered as at 36 and engages a corresponding taper 38 on the lower end of the tine and is joined to the tine by means indicated at 40, which may be brazing or epoxy cement, or the like.

By tapering the tine and the hard tip, as shown, adequate area is provided for effecting a good brazed, or cemented connection between the two members while, furthermore, the tine supports the hard tip and inhibits cracking or breaking of the tip due to internal pressures that might be developed therein and which would place the material of the hard tip in tension.

At its lower end tip 20 has an external taper 42 leaving a relatively small edge 44 facing downwardly and serving as the cutting edge.

In diameter the hard tip 20 is of about the same size as the tine at the level marked with the dot-dash circle 46 in FIG. 2. By making the hard tip to a larger diameter than the lowermost end of the tine, the tine is protected from the abrasive effect of the earth and wears away extremely slowly. If the hard tip were to be about the same diameter as the lower end of the tine, a good bit of the length of the tine would be subjected to abrasion from the earth and the tine would wear thin in the region directly above the hard tip and could fail within a short time.

By the arrangement shown, the tines are subjected to a minimum abrasive effect and the steel of the tines will last substantially as long as the hard tip. It is estimated that a tine tipped in the manner disclosed in the present application will last from 10 to 20 times as long as an untipped tine and would cost about twice as much as an untipped tine and substantial economy is therefore realized in the reduction of downtime of the equipment using the tines and in the greatly reduced cost of the tines per unit area worked.

In arriving at the material from which the hard tip 20 is made, an extremely hard cemented carbide material can be employed for the longest life with respect to abrasion where the conditions encountered are purely abrasive. However, where the possibility exists that the tip may encounter stones or the like, a somewhat tougher grade of cemented carbide composition can be employed to reduce the possibility of the tip fracturing upon impact with a stone while at the same time, abrasion resistance of the material would be somewhat reduced. In any case, a tine hard tipped according to the present invention would have a life many times as long as the life of an untipped tine.

The tine has been described as being particularly useful in connection with the aeration of the greens of golf courses and, while this represents a principal region in which machines of the nature referred to are employed, such machines having hard-tipped tines according to the present invention can be used on regular lawns and the like to advantageous effect. The hard tipping of the tines according to the present invention has special merit when such machines are used on conventional lawns because it is the rule rather than the exception that stones and the like would be encountered in aerating a conventional lawn. Conventional steel tines will collapse or break or be otherwise severely damaged immediately upon impacting against a stone whereas a tine according to the present invention will be damaged only in exceptional instances.

The present invention has been illustrated in the form of one modification only but it will be understood that modifications and adaptations thereof could be made falling within the scope of the appended claims.

What we claim is:

1. A tine, especially for perforating turf while taking a plug therefrom, said tine comprising: an elongated thin walled tubular metal member, said member being adapted for having one end fixed in a reciprocating crosshead to be driven axially thereby into the turf to be perforated so as to take a plug from the turf into the other end of the tubular member, a hard wear-resistant ring element fixed to said other end of the member and forming the portion of said member which effects the cutting of said turf, the outside diameter of said ring elements being greater than the outside diameter of said tubular member at least in the region of the said other end of said tubular member, said tubular member tapering inwardly slightly from its said one end to its said other end and the outside diameter of said ring element being about equal to the outside diameter of said tubular member in the region of the axial center thereof.

2. A tine according to claim 1 in which said other end of said member and the adjacent end of said ring element have complimentary interengaging tapers thereon.

3. A tine according to claim 2 in which the taper on said other end of said tubular member is an internal taper and the taper on the adjacent end of said ring element is an external taper.

4. A tine according to claim 3 in which the end of said ring element facing away from said tubular element has an external taper thereon defining an annular cutting edge on the ring element.

5. A tine according to claim 4 in which the internal diameter of said ring element is about equal to the internal diameter of said tubular member at its said other end.

6. A tine according to claim 5 in which said ring element and tubular member are connected by brazing.

7. A tine according to claim 6 in which said ring element is formed of cemented metal carbide material.